United States Patent [19]

Jürgensen

[11] Patent Number: 6,151,343
[45] Date of Patent: Nov. 21, 2000

[54] METHOD AND APPARATUS FOR DRIVING DIODE PUMPED SOLID-STATE LASERS

[75] Inventor: Heinrich Jürgensen, Raisdorf, Germany

[73] Assignee: Heidelberger Druckmaschinen Ag, Kiel, Germany

[21] Appl. No.: 09/029,687

[22] PCT Filed: Aug. 23, 1996

[86] PCT No.: PCT/DE96/01565

§ 371 Date: May 28, 1998

§ 102(e) Date: May 28, 1998

[87] PCT Pub. No.: WO97/11517

PCT Pub. Date: Mar. 27, 1997

[30] Foreign Application Priority Data

Sep. 5, 1995 [DE] Germany .......................... 195 32 648

[51] Int. Cl.$^7$ .................................................. H01S 3/00
[52] U.S. Cl. .................................. 372/38; 372/9; 372/29; 372/75
[58] Field of Search ................................ 372/38, 29–32, 372/69, 70, 10; 369/122

[56] References Cited

U.S. PATENT DOCUMENTS

| | | | |
|---|---|---|---|
| 4,918,704 | 4/1990 | Caprara et al. | |
| 5,177,755 | 1/1993 | Johnson | 372/38 |
| 5,226,051 | 7/1993 | Chan | 372/30 |
| 5,303,248 | 4/1994 | Gibbs | 372/25 |

FOREIGN PATENT DOCUMENTS

| | | |
|---|---|---|
| 2 256 309 | 2/1992 | United Kingdom . |
| WO 92/10015 | 11/1992 | WIPO . |

OTHER PUBLICATIONS

Patent Abstracts of Japan—JP 4217381—Aug. 7, 1992—vol. 16, No. 567 (E–1296)—Semiconductor Laser Drive Circuit.

Patent Abstracts of Japan—JP58102583—Jun. 18, 1983—vol. 7, No. 204 (E–197)—Circuit for Controlling Extinction Ratio of Detector Typelaser Diode.

Patent Abstracts of Japan—JP62169486—Jul. 25, 1987—vol.12, No. 9 (E–572)—Semiconductor Laser Driving Device.

Intensity Noise In Diode–Pumped Single–Frequency Nd:YAG Lasers and its Control by Electronic Feedback 8342 IEEE Photonics Technology Letters 2(1990) Apr., No. 4, New York, US—Thoms J. Kane.

Primary Examiner—Frank G. Font
Assistant Examiner—Gioacchino Inzirillo
Attorney, Agent, or Firm—Hill & Simpson

[57] ABSTRACT

In a method and an apparatus for driving a diode-pumped solid-state laser, the light power emitted by the solid-state laser (1) is determined as a measurement signal, using a measurement apparatus. By comparison of the measurement signal with a predetermined light power target value, a control deviation is determined in a control amplifier the deviation being converted in a generator into a driver current for a laser diode used as a pump diode for the resonator of the solid-state laser. For the damping of high-frequency disturbances of the light power, in a high-bandwidth negative feedback branch the high-frequency components of the measurement signal are filtered out by means of a high-pass filter and are supplied to a fast control amplifier. In a control element connected in parallel to the laser diode, a portion of the driver current supplied to the laser diode is controlled dependent on the high-frequency components of the measurement signal.

13 Claims, 2 Drawing Sheets

METHOD AND APPARATUS FOR DRIVING DIODE PUMPED SOLID-STATE LASERS

BACKGROUND OF THE INVENTION

The invention relates to the field of reproduction technology, and concerns a method and an apparatus for driving diode-pumped solid-state lasers. Such solid-state lasers have a tendency to what are known as "relaxation oscillations," which are dependent on the resonator geometry and the pumping level. When the resonator is excited, oscillations arise in the laser output, which decay after a more or less long time. Although the amplitudes of these oscillations often lie only in the range of a few percent of the laser output, solid-state lasers cannot be unproblematically used in the area of reproduction technology in exposers (recorders) for exposing images and color separations, because they produce stripe-like or wood-grain-like impermissible image disturbances in the color separations. In order to produce a good reproduction quality, oscillation amplitudes of the solid-state laser in the value range 0.1 to 0.2% are just permissible.

In practice, it is thus attempted to avoid exciting the resonator of the solid-state laser, and a particular emphasisis given to freeing the operating current of the laser diode from spikes of the switched-mode power supplies. Nonetheless, sporadically occurring oscillations cannot be entirely avoided.

SUMMARY OF THE INVENTION

It is thus an object of the present invention to improve a method and apparatus for driving diode-pumped solid-state lasers so that disturbing oscillations are suppressed, even during excitation.

This object is solved according to the invention in that the resonator is damped by introducing a fast light controlling in addition to the already-present slow light controlling, said fast controlling being designed only for the amplitude stability of the solid-state laser.

In the following, the invention is explained in more detail on the basis of FIGS. 1 to 3.

DESCRIPTION OF THE PREFERRED EMBODIMENTS

Figure 1:
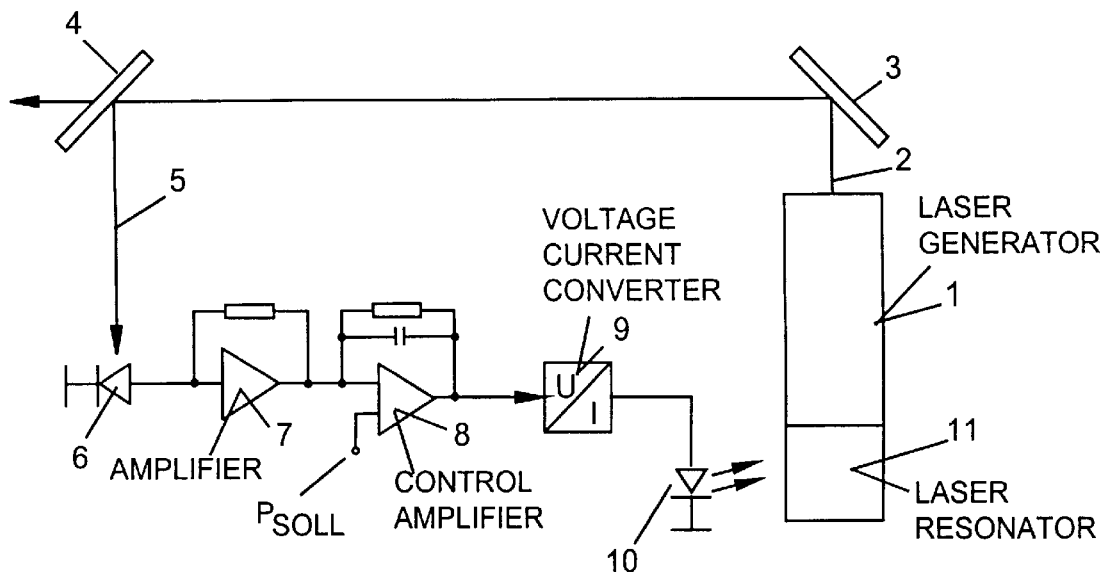
FIG. 1 shows a drive circuit for a diode-pumped solid-state laser according to the prior art.

FIG. 1 shows a drive circuit or driver circuit for a diode-pumped solid-state laser, with a negative feedback branch for the lower frequency range according to the prior art. A laser generator 1 produces a laser beam 2 with the light power (P), said beam being deflected by a deflecting mirror 3. In the beam path of the laser beam 2, a beam divider 4 is arranged that divides off a measurement beam 5 from the laser beam 2, which measurement beam is a measure of the actual light power of the laser beam 2. The measurement beam 5 is supplied to a negative feedback branch or, respectively, to a control loop, and there falls on a light-measuring diode 6 that is connected downstream from a fast light measurement amplifier 7. A measurement signal produced in the light measurement amplifier 7 is forwarded to a control amplifier 8 that is connected to the light measurement amplifier 7. The light power actual value ($P_{IST}$) determined in the light measurement amplifier 7 is supplied to the one input of the control amplifier 8, while the other input is charged with the light power target value ($P_{SOLL}$). The control signal obtained in the control amplifier 8 is supplied to a voltage/current converter 9 connected downstream. The voltage/current converter (9), constructed for example from high-power transistors, serves for the production of, a driver current of e.g. 20 A, for a laser diode 10 that operates as a pump diode, and which excites a laser resonator 11 in the laser generator 1.

In the known solid-state lasers, the relaxation oscillations lie in the typical value range of 50 to 100, and sometimes even up to 200 kHz. These high-frequency relaxation oscillations cannot satisfactorily be eliminated using the specified drive circuit, because the bandwidth of the control loop, conditioned by the relatively low cutoff frequency of the high-power transistors used, is also too low to negatively feed back the high-frequency disturbances.

Figure 2:
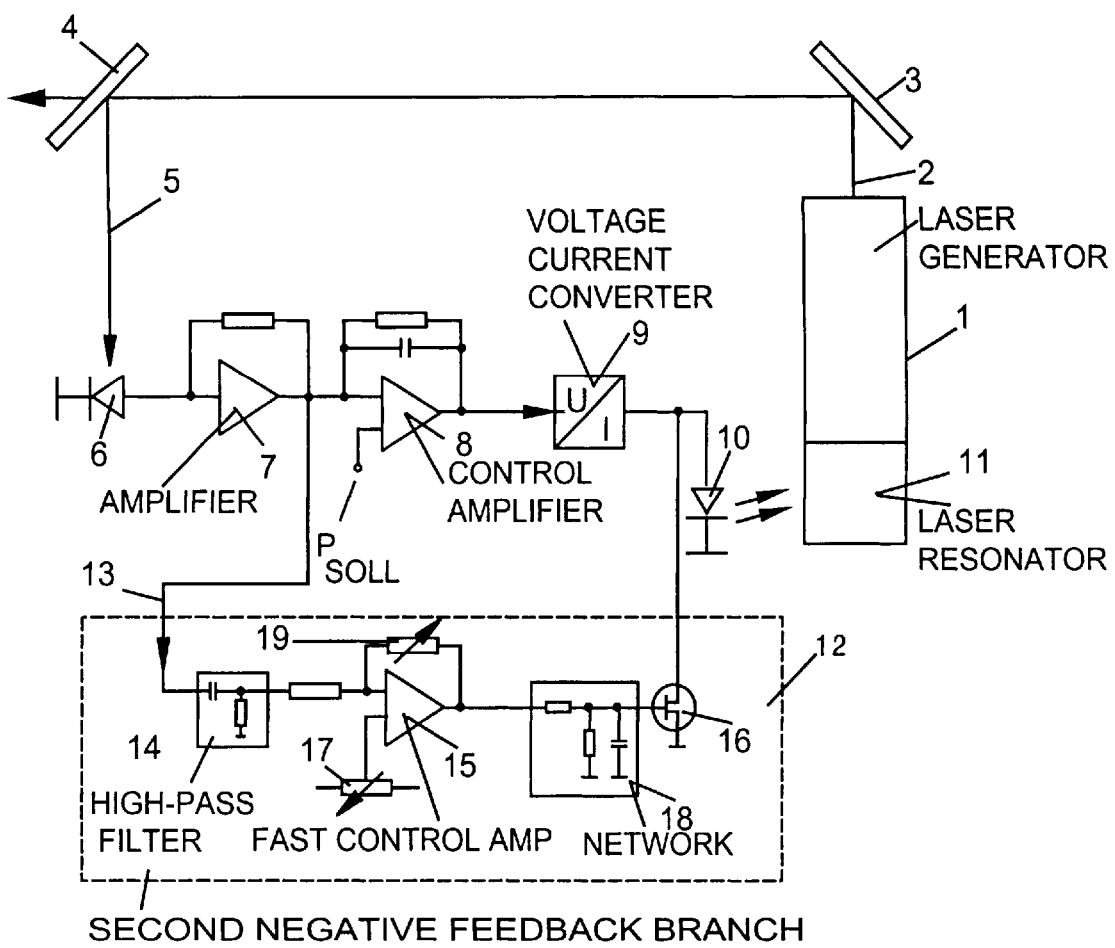
FIG. 2 shows a drive circuit for a diode-pumped solid-state laser according to the invention.

FIG. 2 shows a drive circuit or driver circuit for a diode-pumped solid-state laser with the electrical damping of the high-frequency relaxation oscillations according to the invention.

In order to carry out the electrical damping of the relaxation oscillations of the invention, the known drive circuit shown in FIG. 1 is supplemented in FIG. 2 with a second negative feedback branch 12 for the high frequency region, i.e. with a fast control loop.

The amplified measurement signal, produced in the light measurement diode 6 and amplified in the light measurement amplifier 7, is supplied to a high-pass filter 14 in the feedback branch 12 via a line 13. The light measurement diode 6 must thereby be created in such a way that it can measure the amplitudes of the high-frequency disturbances. The high-pass filter 14 couples out only the high-frequency portion of the measurement signal from the light measurement amplifier 7. The output signal of the high-pass filter 14, which represents the high-frequency disturbing signal, the relaxation oscillations, is provided given to the first input of a fast control amplifier 15. It is thereby important that the light measurement amplifier 7 already has a sufficient bandwidth to fully transmit the disturbing signal. For the stability of the fast control loop 12, it is advantageous if its bandwidth is higher by a factor of 10, so that no disturbing phase distortions occur. A fast bipolar or field-effect transistor 16, whose base current is produced in the fast control amplifier 15, is connected in parallel with the laser diode 10. The bipolar or field-effect transistor 16 branches off a small portion of, e.g. 1.5 A, of the driver current of about 20 A flowing through the laser diode 10, by which a faster modulation is achieved. The laser diode 10 should be created in such a way that it can be modulated by current modifications in the frequency range in which the high-frequency disturbances occur. In general, however, laser diodes can be modulated well into the megahertz range.

In accordance with the invention, the portion of the driver current controlled dependent on the higher-frequency components of the measurement signal is made 0.5 to 50% of the driver current.

The operating point of the bipolar or field-effect transistor 16 is set via the potentiometer 17 that is present at the second input of the fast control amplifier 15. The signal phase direction is set so that a greater disturbance amplitude at the input of the fast control amplifier 15 results in an increase of the current through the bipolar or field-effect transistor 16, and thereby effects a reduction of the driver current the laser diode 10. By this, the amplitude of the light of the laser diode 10 operating as a pump diode is reduced, and a reduction by damping of the relaxation oscillations is thereby advantageously effected.

The network 18 made of resistors and capacitors provides a correct adaptation of the phase curve of the system, so that the stability condition is fulfilled for the control loop, and a sufficient negative feedback is present in the entire range in which relaxation oscillations can occur. The degree of damping can be set with a controller 19 that modifies the loop amplification in the negative feedback branch of the fast control amplifier 15. The network 18 can be modified arbitrarily, or can also be formed of active and passive components. This holds in particular when dead times, as are present in the laser resonator and the coupling lines, produce undesirable phase rotations. These are to be compensated in order to achieve a stable control loop with sufficient loop amplification in the required frequency range.

Figure 3:
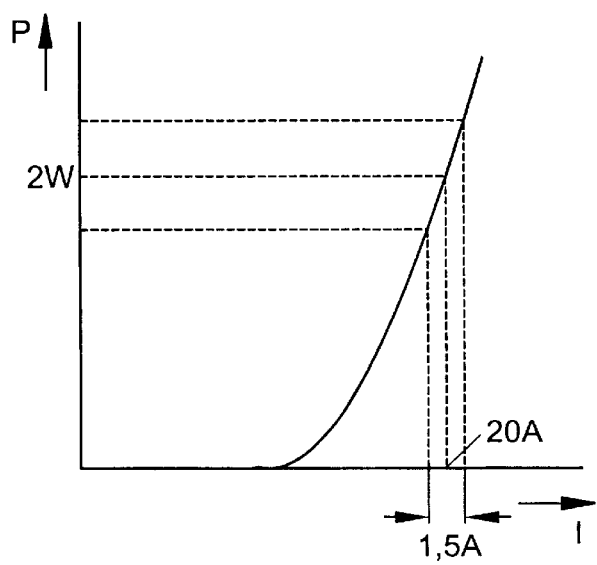
FIG. 3 shows a characteristic of a laser diode.

FIG. 3 shows the characteristic of the laser diode 10, in which the dependency of the light power (P) on the current (I) is shown. It is shown that a current of, e.g. 1.5 A, is already sufficient to produce a 5% change of amplitude in the light power, while the driver current of the laser diode 10 is e.g. 20 A.

Although various minor changes and modifications might be proposed by those skilled in the art, it will be understood that my wish is to include within the claims of the patent warranted hereon all such changes and modifications as reasonably come within my contribution to the art.

What is claimed is:

1. A method for driving a diode-pumped solid-state laser, comprising the steps of:
    determining a measurement signal for a control circuit as an actual value of light power emitted by the solid-state laser;
    determining a control deviation by comparing the measurement signal with a predetermined light power target value;
    converting the determined control deviation into a driver current for a laser diode used as a pump diode for a resonator of the solid-state laser;
    filtering out higher-frequency components of the measurement signal for damping of corresponding higher-frequency disturbances of the light power, and supplying the filtered out components in an additional control circuit having a bandwidth corresponding to the higher-frequency disturbances;
    by use of said additional control circuit, controlling a portion of the driver current supplied to the laser diode dependent on the filtered-out higher-frequency components of the measurement signal; and
    making the portion of the driver current which is controlled dependent on the higher-frequency components of the measurement signal 0.5 to 50% of the driver current.

2. The method according to claim 1 wherein the laser diode is controlled in a frequency range of the higher-frequency disturbances of the emitted light power.

3. The method according to claim 1 wherein a direction of effect of a control signal in the additional control circuit is selected so that an increase in amplitude of the higher-frequency components of the measurement signal effects a reduction of the driver current supplied to the laser diode.

4. The method according to claim 1 wherein a degree of damping of the higher-frequency disturbances of the light power emitted by the laser diode is set by a loop amplification of the additional control circuit.

5. A method for driving a diode-pumped solid-state laser, comprising the steps of:
    determining a measurement signal as an actual value of light power emitted by the solid-state laser;
    in a first feedback path, determining a control deviation by comparing the measurement signal with a predetermined light power target value;
    converting the determined control deviation into a driver current for a laser diode used as a pump diode for a resonator of the solid-state laser;
    in a separate second feedback path parallel to the first feedback path, filtering out higher-frequency components of the measurement signal for damping of corresponding higher-frequency disturbances of the light power; and
    controlling a portion of the driver current supplied to the laser diode dependent on the filtered-out higher-frequency components of the measurement signal, said portion being 0.5 to 50% of the driver current.

6. An apparatus for driving a diode-pumped solid-state laser, comprising:
    a solid-state laser with a resonator;
    a laser diode used as a pump diode for the resonator;
    a measurement unit for determining a measurement signal as an actual value of light power emitted by the solid-state laser;
    a first control circuit receiving said measurement signal and having a control amplifier for determining a control deviation by comparison of the measurement signal with a predetermined light power target value;
    a converter connected downstream from the control amplifier for producing a driver current for the laser diode, said current corresponding to said determined control deviation;
    a second control circuit having a high-pass filter connected to receive said measurement signal for filtering out higher-frequency components from the measurement signal corresponding to higher-frequency disturbances of the light power;
    a fast control amplifier connected downstream from the high-pass filter; and
    a control element connected to the fast control amplifier for controlling a portion of the driver current supplied to the laser diode dependent on the filtered-out, higher-frequency components of the measurement signal, said portion being 0.5 to 50% of the driver current.

7. The apparatus according to claim 6 wherein the control element is connected in parallel to the laser diode.

8. The apparatus according to claim 6 wherein the control element is connected in parallel to the converter.

9. The apparatus according to claim 6 wherein the measurement unit comprises a partly transparent mirror in a beam path of the solid-state laser, a light measurement diode, and a light measurement amplifier.

10. The apparatus according to claim 6 wherein the control element is a transistor which is driven dependent on the higher-frequency components of the measurement signal.

11. The apparatus according to claim 6 wherein the additional control circuit comprises a network for adapting an amplitude/phase characteristic of the additional control circuit.

12. The apparatus according to claim 10 wherein a circuit is provided for setting an operating point of the transistor.

13. An apparatus for driving a diode-pumped solid-state laser, comprising:

a solid-state laser with a resonator;

a laser diode used as a pump diode for the resonator;

a measurement unit for determining a measurement signal as an actual value of light power emitted by the solid-state laser;

a first feedback path having a first control circuit receiving said measurement signal for determining a control deviation by comparison of the measurement signal with a predetermined light power target value, and for producing a driver current for the laser diode, said current corresponding to said determined control deviation; and a second feedback path parallel to the first feedback path and having a second control circuit connected to receive said measurement signal for filtering out higher-frequency components from the measurement signal corresponding to higher-frequency disturbances of the light power, for controlling a portion of the driver current supplied to the laser diode dependent on the filtered-out, higher-frequency components of the measurement signal, said portion being 0.5 to 50% of the driver current.

* * * * *